United States Patent
John et al.

(10) Patent No.: US 11,943,820 B2
(45) Date of Patent: Mar. 26, 2024

(54) WI-FI ACCESS PRIORITIZATION AND CALL ADMISSION CONTROL

(71) Applicant: Verizon Patent and Licensing Inc., Arlington, VA (US)

(72) Inventors: Toby Varughese John, Murphy, TX (US); Shashi Kotvali, Frisco, TX (US); Bibi M. Hakimzadeh, Fort Worth, TX (US); James S. Abraham, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 16/715,121

(22) Filed: Dec. 16, 2019

(65) Prior Publication Data

US 2021/0185738 A1 Jun. 17, 2021

(51) Int. Cl.
| | |
|---|---|
| *H04W 76/10* | (2018.01) |
| *H04L 5/00* | (2006.01) |
| *H04W 12/06* | (2021.01) |
| *H04W 28/02* | (2009.01) |
| *H04W 72/56* | (2023.01) |

(Continued)

(52) U.S. Cl.
CPC ........... *H04W 76/10* (2018.02); *H04L 5/0048* (2013.01); *H04W 12/06* (2013.01); *H04W 28/0289* (2013.01); *H04W 72/56* (2023.01); *H04W 76/30* (2018.02); *H04W 84/12* (2013.01)

(58) Field of Classification Search
CPC . H04W 76/10; H04W 28/0289; H04W 12/06; H04W 76/30; H04W 72/10; H04W 84/12; H04L 5/0048
See application file for complete search history.

(56) References Cited

U.S. PATENT DOCUMENTS

| | | | |
|---|---|---|---|
| 9,356,804 B1 * | 5/2016 | Passaglia | H04L 67/63 |
| 2005/0053046 A1 * | 3/2005 | Wang | H04W 40/02 |
| | | | 370/338 |

(Continued)

OTHER PUBLICATIONS

IEEE Standard 802.11-2012.Part 11: Wireless LAN Medium Access Control (MAC) and Physical Layer (PHY) Specifications. Section 8.3.3.9, Table 8-26. pp. 429-430. (Year: 2012).*

*Primary Examiner* — Jason E Mattis
*Assistant Examiner* — Robert Ma

(57) ABSTRACT

A method, a device, and a non-transitory storage medium are described in which a Wi-Fi admission control and prioritization service is provided. The Wi-Fi admission control and prioritization service may be included in a Wi-Fi access device. The Wi-Fi admission control and prioritization service may include the Wi-Fi access device reserving Wi-Fi data connections for priority users. An end device may transmit priority information to the Wi-Fi access device during a Wi-Fi connection establishment procedure. The Wi-Fi access device may use one of the reserved data connections to establish a Wi-Fi connection with the end device. The priority information may include a non-Wi-Fi access control class value that indicates the end device is of a high priority. The Wi-Fi access device may provide quality of service and prioritization, which is in correspondence to the priority information, to traffic of the end device that traverses the Wi-Fi access device.

20 Claims, 13 Drawing Sheets

(51) Int. Cl.
*H04W 76/30* (2018.01)
*H04W 84/12* (2009.01)

(56) References Cited

U.S. PATENT DOCUMENTS

| | | | |
|---|---|---|---|
| 2013/0182644 A1* | 7/2013 | Kim | H04W 4/70 |
| | | | 370/328 |
| 2013/0201922 A1* | 8/2013 | Fredericks | H04W 76/36 |
| | | | 370/329 |
| 2015/0067172 A1* | 3/2015 | Ashokan | H04L 67/101 |
| | | | 709/226 |
| 2015/0327158 A1* | 11/2015 | Wentink | H04W 8/005 |
| | | | 370/254 |
| 2018/0062819 A1* | 3/2018 | Horn | H04L 5/0058 |
| 2018/0295510 A1* | 10/2018 | Vikberg | H04L 67/306 |
| 2019/0166518 A1* | 5/2019 | Arora | H04W 8/04 |
| 2020/0187088 A1* | 6/2020 | Chun | H04W 48/02 |

* cited by examiner

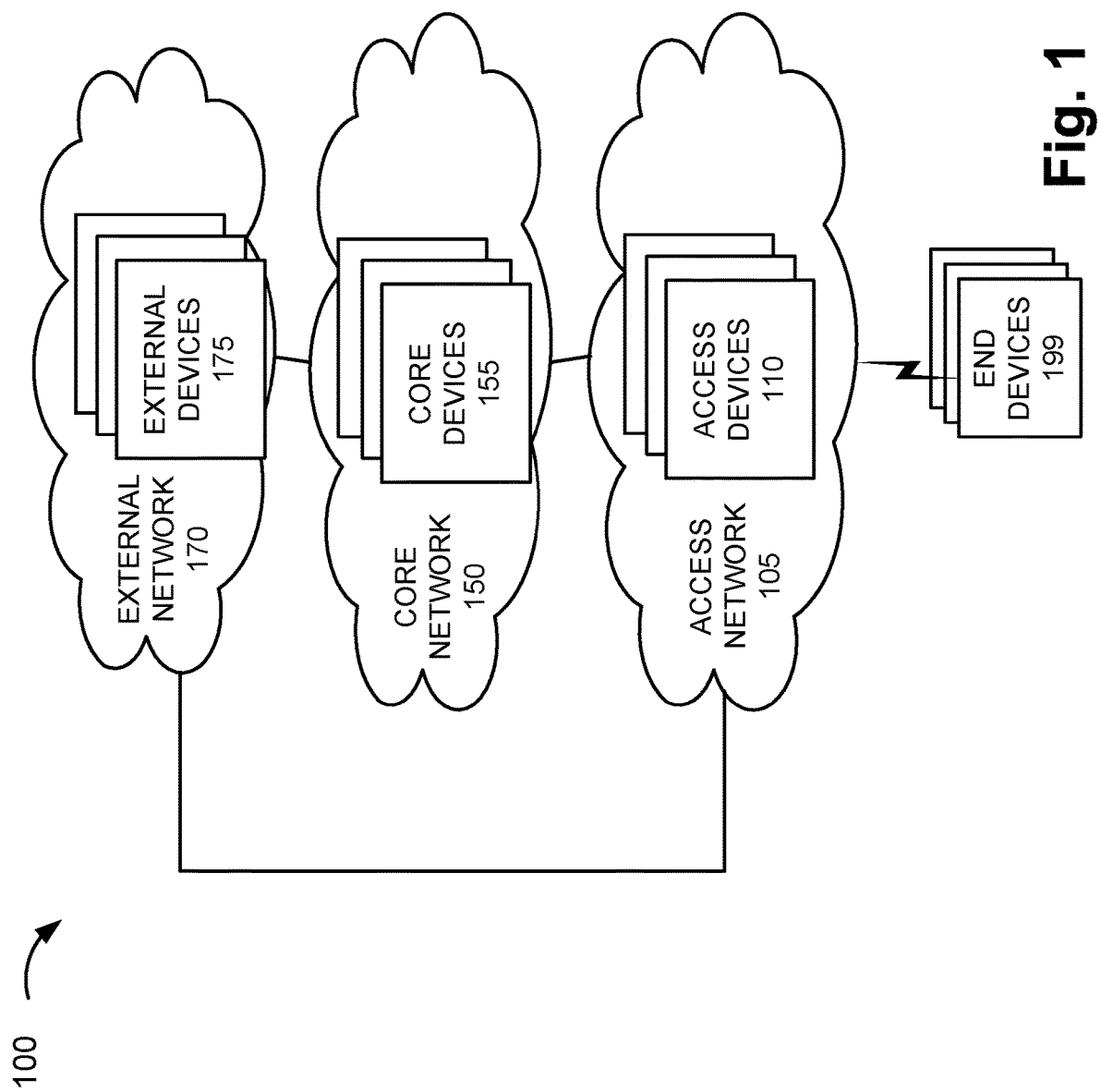

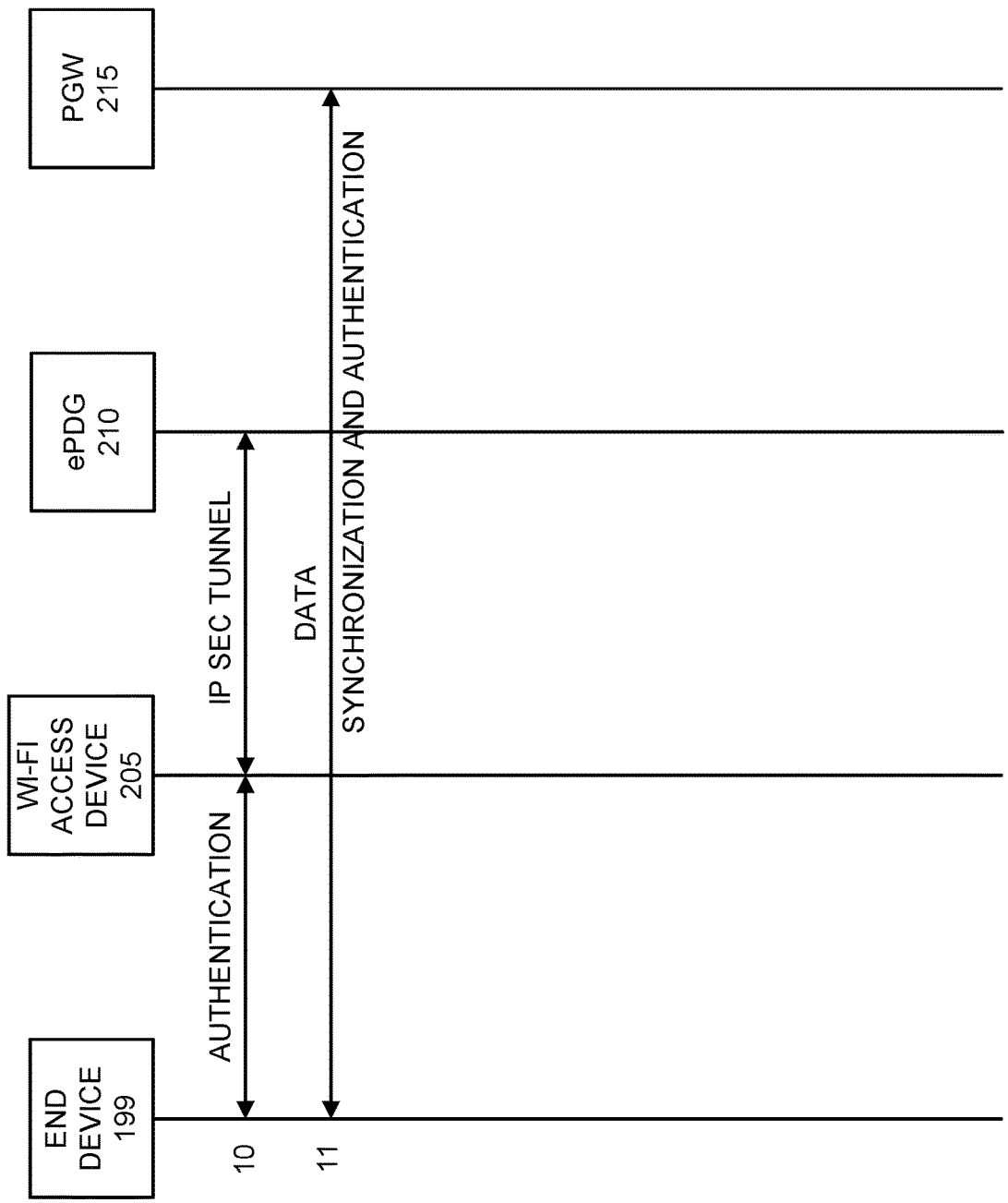

| APPLICATION SERVICE INFORMATION | | |
|---|---|---|
| PRIORITY LEVEL | USER PRIORITY | ACCESS CATEGORY |
| 0-9 | 1 | AC_BK |
| 0-9 | 2 | AC_BK |
| 0-9 | 0 | AC_BE |
| 0-9 | 3 | AC_BE |
| 0-9 | 4 | AC_VI |
| 0-9 | 5 | AC_VI |
| 0-9 | 6 | AC_VO |
| 0-9 | 7 | AC_VO |
| 10-13 | 8 | AC_HI |
| 14-15 | 9 | AC_HI |

| APPLICATION SERVICE INFORMATION | | |
|---|---|---|
| PRIORITY LEVEL | USER PRIORITY | ACCESS CATEGORY |
| 0-9 | 1 | AC_BK |
| 10-13 | 2 | AC_BK |
| 14-15 | 3 | AC-HBK |
| 0-9 | 0 | AC_BE |
| 10-13 | 4 | AC_BE |
| 14-15 | 5 | AC_HBE |
| 0-9 | 6 | AC_VI |
| 10-13 | 7 | AC_VI |
| 14-15 | 8 | AC_HVI |
| 0-9 | 9 | AC_VO |
| 10-13 | 10 | AC_VO |
| 14-15 | 11 | AC_HVO |

← 405 (PRIORITY LEVEL)
← 410 (USER PRIORITY)
← 415 (ACCESS CATEGORY)

430-1 → ... 430-12 →

400

WI-FI ACCESS PRIORITIZATION AND CALL ADMISSION CONTROL

BACKGROUND

Development and design of radio access networks (RANs), core networks, and application service networks, present certain challenges from a network-side perspective and an end device perspective. For example, depending on the configurations from both network-side and end device-side perspectives, such configurations may reduce the effective use of resources and negatively impact various performance metrics, such as access, congestion, latency, throughput, etc. Accordingly, a need exists to overcome these challenges.

BRIEF DESCRIPTION OF THE DRAWINGS

FIG. 1 is a diagram illustrating an exemplary environment in which an exemplary embodiment of a Wi-Fi admission control and prioritization service may be implemented;

FIGS. 2A and 2B are diagrams illustrating an exemplary process in which an exemplary embodiment of the Wi-Fi admission control and prioritization service may be implemented;

FIG. 3 is a diagram illustrating exemplary application service information of an exemplary embodiment of the Wi-Fi admission control and prioritization service;

FIG. 4 is a diagram illustrating other exemplary application service information of an exemplary embodiment of the Wi-Fi admission control and prioritization service;

DETAILED DESCRIPTION OF PREFERRED EMBODIMENTS

Figure 2A:
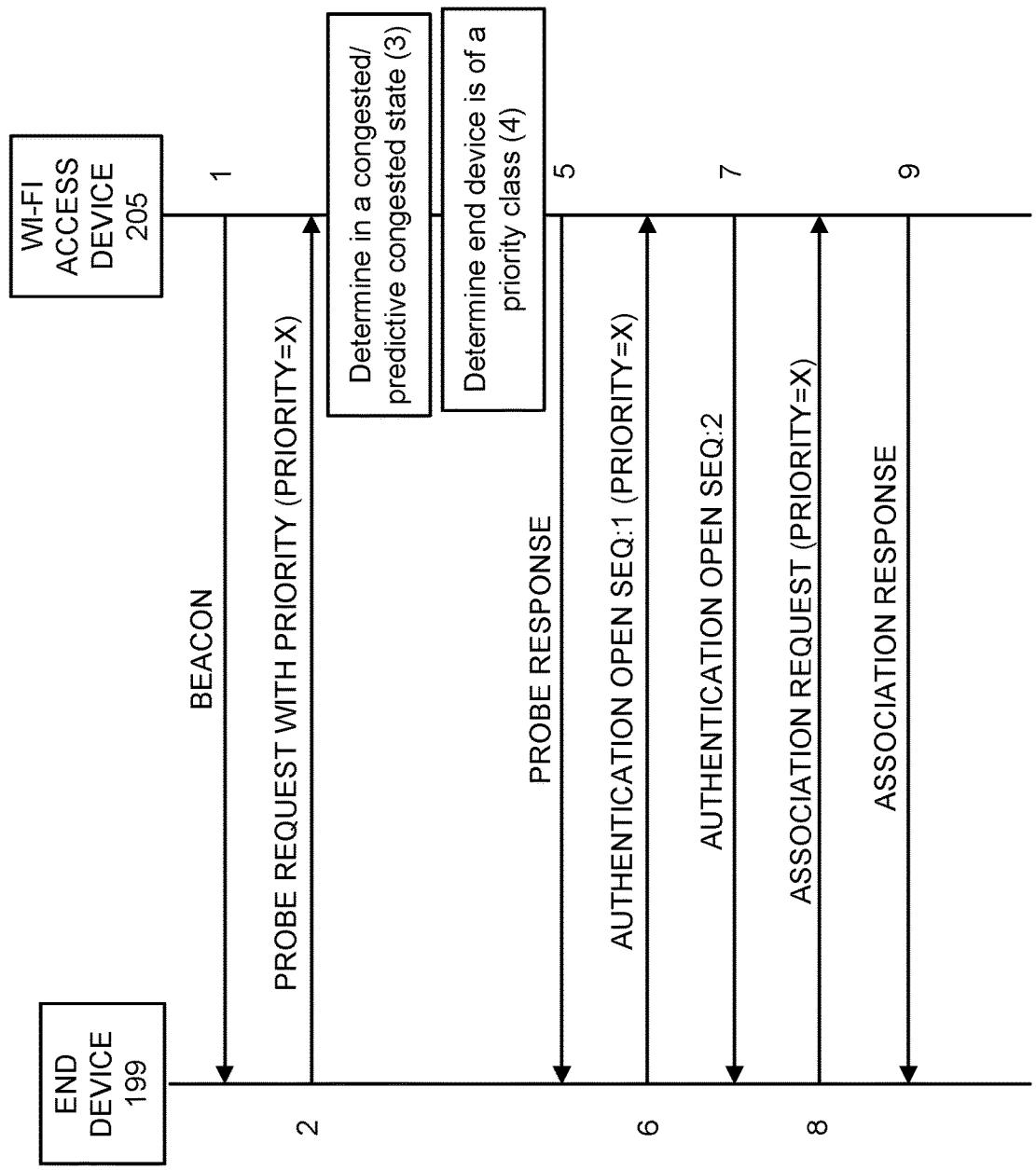

The following detailed description refers to the accompanying drawings. The same reference numbers in different drawings may identify the same or similar elements. Also, the following detailed description does not limit the invention.

The increase in mobile device utilization and data demand is a factor in the interoperability between RANs and Wi-Fi access points (APs). The interoperability of a RAN and a Wi-Fi access point may be used for both ground-based device and air-based device communications. For example, an in-flight device may communicate with the RAN via a high-powered Wi-Fi access point. Offloading traffic to the Wi-Fi access point can alleviate RAN utilization since the RAN may typically be a bottleneck in the network.

During crisis, natural disaster, or other circumstances when the RAN may be congested or unavailable, some priority users (e.g., Emergency 911 users, Natural Security users, Governmental users, etc.) may be afforded access to Wi-Fi access points to use various services, such as messaging, voice and video calls, Internet access, or other type of application services (e.g., ultra-reliable communications, etc.) via an evolved Packet Data Gateway (ePDG). Additionally, a Fifth Generation (5G) or future generation fixed wireless access device may have a built-in Wi-Fi modem connected to a data network that may be managed by a network provider. Even so, Wi-Fi access points may also experience congestion. For example, a Wi-Fi access point may be subject to excessive connection demand, limited bandwidth, a Denial of Service (DoS) attack, or other circumstance that may degrade wireless access and consequently inhibit the priority user to access and establish a service (e.g., a call, Internet access, etc.).

According to exemplary embodiments, a Wi-Fi admission control and prioritization service is described. According to an exemplary embodiment, the Wi-Fi admission control and prioritization service may provide priority users with admission control and quality of service (QoS) priority to Wi-Fi access points over other types of users. According to an exemplary embodiment, the Wi-Fi access point may be a device that operates according to an Institute of Electrical and Electronics Engineers (IEEE) 802.11 standard (also known as 802.11x) (e.g., 802.11a, 802.11b, 802.11n, 802.11ac, etc.).

According to an exemplary embodiment, the priority user may be a user and/or an end device within a special class, such as the special class 11-15 or 10-15 of an Access Control Class (ACC) pertaining to a network (e.g., Long Term Evolution (LTE), LTE-Advanced (LTE-A), LTE-A Pro, Fifth Generation (5G), etc.), a network standard (e.g., Third Generation Partnership Project (3GPP), 3GPP2, International Telecommunication Union (ITU), European Telecommunications Standards Institute (ETSI)), and/or an access class barring (ACB) configuration scheme. According to another exemplary embodiment, the priority user may be a user and/or an end device within a special class according to a proprietary or non-standard ACC scheme.

According to an exemplary embodiment, the Wi-Fi control and prioritization service may be invoked when the Wi-Fi access point is congested and/or congestion is predicted (e.g., a prospective congestion). According to an exemplary embodiment, the Wi-Fi control and prioritization service may be invoked not based on congestion control, but may be invoked based on an operator controlled Operations and Maintenance (O&M) procedure and/or another type of configuration.

According to an exemplary embodiment, the Wi-Fi admission control and prioritization service may use priority information that may be stored or accessed by the end device. For example, priority information may be included in an Access Control Class (ACC) file that may be stored in a Universal Subscriber Identity Module (USIM) applet of a Universal Integrated Circuit Card (UICC) or other storage medium, as described herein. According to an exemplary embodiment, the end device of a priority user may include priority information in a message used to establish a Wi-Fi connection with the Wi-Fi access point. According to an exemplary embodiment, the Wi-Fi admission control and prioritization service may include distinguishing the priority user on a Wi-Fi radio link so that access may be granted when the Wi-Fi access point is congested, subject to potential or predicted congestion, or some other state that may degrade performance. The Wi-Fi admission control and prioritization service may afford priority to priority users over other users and/or end devices that may be requesting sessions or may already have active sessions.

According to exemplary embodiments, the Wi-Fi admission control and prioritization service may afford priority to traffic of the priority user. For example, the Wi-Fi access point may afford priority by way of routing and/or processing traffic to and from an end device and/or a network device in a network path of a priority user's session, as described herein. According to an exemplary embodiment, the Wi-Fi admission control and prioritization service may afford priority to all traffic associated with the priority user. According to another exemplary embodiment, the Wi-Fi admission control and prioritization service may afford priority to traffic according to traffic categories. For example, the traffic categories may be the traffic categories or classification associated with the Wireless Multimedia Extension (WME) of the Wi-Fi 802.11 standard. According to an exemplary embodiment, the Wi-Fi admission control and prioritization service may afford different priorities to priority users based on the ACC and traffic category.

FIG. 1 is a diagram illustrating an exemplary environment 100 in which an exemplary embodiment of the Wi-Fi admission control and prioritization service may be implemented. As illustrated, environment 100 includes an access network 105, a core network 150, and an external network 170. Access network 105 includes access devices 110, core network 150 includes core devices 155, and external network 170 includes external devices 175. Environment 100 further includes end devices 199.

The number, type, and arrangement of networks illustrated in environment 100 are exemplary. Additionally, or alternatively, other networks not illustrated in FIG. 1 may be included in environment 100, such as a backhaul/fronthaul network or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the Wi-Fi admission control and prioritization service may use at least one of these planes of communication. Additionally, an interface of a network device may be modified (e.g., relative to an interface defined by a standards body, such as 3GPP, 3GPP2, ITU, ETSI, IEEE 802.11, etc.) or a new interface of the network device may be provided in order to support the communication (e.g., transmission and reception of messages, information elements (IE), attribute value pairs (AVPs), etc.) between network devices and the Wi-Fi admission control and prioritization service logic, as described herein. For example, a Wi-Fi interface may be modified to transmit and receive priority information, as described herein. According to various exemplary implementations, the interface of the network device may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of an LTE network, an LTE-A network, and/or an LTE-A Pro network, a next generation (NG) RAN, and/or another type of RAN. Access network 105 may further include other types of wireless networks, such as a Wi-Fi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge. Additionally, or alternatively, access network 105 may include a wired network, an optical network, or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiMax device, a hotspot device, etc.) that provides a wireless access service.

According to exemplary embodiments, access devices 110 include a Wi-Fi access device that is Wi-Fi enabled and provides Wi-Fi access to end devices 199. The Wi-Fi access device includes logic of the Wi-Fi admission control and prioritization service, as described herein. According to various exemplary embodiments, the Wi-Fi access device may be a stationary device, a mobile device, included in an unmanned aerial vehicle (UAV) (e.g., a drone, etc.), included in a manned aerial vehicle (MAV) (e.g., a helicopter, etc.), a portable device, a home device, an enterprise device, a public device, a private device, an ad hoc device, a hotspot device, or a fixed wireless access point, for example. The Wi-Fi access device may be implemented as a router, a repeater, a bridge, a smartphone or other type of user equipment/device, or other type of Wi-Fi access point, for example. Wi-Fi access device and Wi-Fi access point may be used interchangeably in the description.

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), an ePDG, a serving gateway (SGW), a home agent (HA), a GPRS support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, an authentication server function (AUSF), a network slice selection function (NSSF), a network repository function (NRF), a policy control function (PCF), a network data analytics function (NWDAF), a network exposure function (NEF), and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Access network 105 and/or core network 150 may include a public network, a private network, and/or an ad hoc network.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a private network, a public network, a multi-access edge computing (MEC) network (also known as a mobile edge computing), a fog network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to various exemplary implementations, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, real-time communications (e.g., voice, video conferencing, etc.), and/or messaging (e.g., texting, etc.). External devices 175 may also include network devices that provide other network-related functions, such as network management, load balancing, security, authentication and authorization, policy control, billing, and routing. External network 170 may include a private network and/or a public network.

End device 199 includes a device that has computational and wireless communicative capabilities. Depending on the implementation, end device 199 may be a mobile device, a portable device, a stationary device, a device operated by a user (e.g., user equipment (UE)), or a device not operated by a user. For example, end device 199 may be implemented as a smartphone, a mobile phone, a personal digital assistant, a tablet, a netbook, a phablet, a wearable device (e.g., a watch, glasses, etc.), a computer, a device in a vehicle, an IoT device, or other type of mobile wireless device. End device 199 may be configured to execute various types of software (e.g., applications, programs, etc.). The number and the types of software may vary among end devices 199. According to an exemplary embodiment, end device 199 provides the Wi-Fi admission control and prioritization service and is Wi-Fi enabled, as described herein.

A Subscriber Identification Module (SIM) card, an embedded SIM (eSIM), a Universal SIM (USIM), a UICC, an embedded UICC (eUICC), or another type of resident storage (e.g., future generation, proprietary, etc.) of an end device may store priority information. For example, a UICC may include a USIM applet or other logic that includes ACC information. For example, an ACC elemental file (EF) may include bits corresponding to access classes ranging from 0-15. Access classes 0-9 correspond to standard access class users (e.g., non-priority users), access control class 10 corresponds to emergency call users, and access control classes 11-15 correspond to special access class or high priority access users. For example, access control class 11 may be for public land mobile network (PLMN) use, access control class 12 may be for security services, access control class 13 may be for public utilities, access control class 14 may be for national security services, and access control class 15 may be for PLMN staff. The term "priority user" or "priority users" may refer to a user, end device 199, or both.

Wi-Fi signaling procedures between end device 199 and the Wi-Fi access point, or between a RAN device (e.g., eNB, etc.) and the Wi-Fi access point do not include any priority information. As a consequence, when the Wi-Fi access point is overloaded, congested, or all existing connections are occupied, for example, a priority user or end device 199 may be unable to establish a radio link with the Wi-Fi access point, and in turn be unable to access and use an application service. For example, the Wi-Fi access point may be limited to accept a finite number of connections that may correspond to the number of Internet Protocol (IP) addresses that are configured. For example, a Class-C IP address range may support about 253 Wi-Fi connections. According to other examples, the Wi-Fi access point may accept a finite number of connections based on some other type of configuration.

According to an exemplary embodiment, the Wi-Fi admission control and prioritization service may include priority or access level information corresponding to the access control class categories in a signaling procedure, as described herein. According to an exemplary embodiment, the Wi-Fi admission control and prioritization service may reserve a number of connections to be used for priority users. For example, a Wi-Fi access device may be configured with a reserved connection value that indicates a maximum number of Wi-Fi connections available for priority users. According to various exemplary embodiments, the reserved connection value may be a static value or a dynamic value. For example, the reserved connection value may be increased or decreased using a network management procedure.

According to an exemplary embodiment, the Wi-Fi admission control and prioritization service may manage the reservation of available connections for the priority users. For example, the Wi-Fi access device may release a session of a priority user when the maximum number of connections is being used, and a new request to establish a Wi-Fi connection is received. For example, the Wi-Fi access device may include rules, policies, and/or other logic that selects the session to be released based on one or multiple factors, such as the state of the session (e.g., active versus idle), the priority of the priority user (e.g., 10 may be lower than 11-15, etc.), and/or other types of session-related (e.g., type of application service, etc.) and/or user-related information.

According to an exemplary embodiment, when the reserved connection value is dynamic, the Wi-Fi admission control and prioritization service may release a session of a non-priority user (e.g., a normal user) to allow a priority user to establish a Wi-Fi connection. The Wi-Fi access device may include rules, policies, and/or other logic that selects the session to be released based on one or multiple factors, such as the state of the session, the duration of the session, and/or other types of session-related (e.g., type of application service, etc.) and/or user-related information.

FIGS. 2A and 2B are diagrams illustrating an exemplary process of the Wi-Fi admission control and prioritization service. For example, the process may correspond to a signaling procedure between end device 199 and a Wi-Fi access device 205. The messages described are exemplary. For purposes of description, according to an exemplary scenario, assume a priority user operates end device 199. Also assume that Wi-Fi access device 205 is in a congested state or a predicted congested state. Further assume that Wi-Fi access device 205 Wi-Fi is configured with a reserved connection value that indicates a reservation of Wi-Fi connections available for priority users. For example, Wi-Fi access device 205 may reserve a pool of Wi-Fi data connections that may be used by priority users when Wi-Fi access device 205 is in the congested state or the predicted congested state.

Referring to FIG. 2A, Wi-Fi access device 205 may transmit a beacon signal within an area of Wi-Fi service (step 1). End device 199 may receive the beacon. As a part of a Wi-Fi connection establishment procedure, end device 199 may generate and transmit a probe request. According to an exemplary embodiment, the probe request may include priority information (step 2). For example, the priority information may indicate an access class category of 11 or some other priority value (e.g., 10, 12, 13, 14, 15), as illustrated in FIG. 2A as "Priority=X". End device 199 may generate the probe request based on the priority information stored by end device 199. For example, an operating system (OS) of end device 199 may fetch and translate the prioritization information (e.g., stored in a SIM or other resident memory) and include the priority information in an access signal message (e.g., the probe request) that is transmitted via a Wi-Fi modem of end device 199. The probe request may include a unique identifier that may identify end device 199 (e.g., a Media Access Control (MAC) address, etc.), a Service Set Identifier (SSID), and/or other information (e.g., a request element, extended supported rates, high throughput (HT) capabilities, channel usage, a direct sequence spread spectrum (DSSS) parameter set, etc.) that may be included in a probe request (e.g., of a Wi-Fi standard).

In step (3), based on the receipt of the probe request, Wi-Fi access device 205 may determine that it is in a congested state or a predicted congested state. Wi-Fi access device 205 may not grant a new Wi-Fi connection to a non-priority user. For example, Wi-Fi access device 205 may ignore the probe request. However, in step (4), Wi-Fi access device 205 may determine that end device 199 is of a priority class. For example, Wi-Fi access device 205 may inspect and/or read an information element or other data field of the probe request, and determine that end device 199 has priority access. Additionally, for example, Wi-Fi access device 205 may compare the number of current Wi-Fi connections associated with priority users to the reserved connection value. Wi-Fi access device 205 may determine whether establishing the Wi-Fi connection with end device 199 would exceed the reserved connection value. According to various exemplary embodiments, when the reserved connection value would be exceeded, Wi-Fi access device 205 may refuse to establish a Wi-Fi connection or release a priority user, as described herein. In step (5), Wi-Fi access device 205 may generate and transmit a probe response that is responsive to the probe request. For example, the probe response may include a requested information element that may have been requested by end device 199.

In step (6), based on the receipt of the probe response, end device 199 may generate and transmit an authentication message. According to this exemplary scenario, assume an open system authentication framework (illustrated as "OPEN" in FIG. 2A) and the first Authentication Frame (illustrated as "SEQ:1" in FIG. 2A). The authentication message may include, for example, a unique identifier of end device 199 and other information according to a Wi-Fi standard. According to an exemplary embodiment, the authentication message may include the priority information.

According to other exemplary scenarios, the authentication mechanism may use a "shared key" authentication mechanism (e.g., challenge messages, etc.) or some other type of authentication mechanism in which authentication messages may be exchanged. According to such an embodiment, one or multiple authentication messages may include the priority information.

In step (7), Wi-Fi access device 205 may receive the authentication message, perform an authentication procedure, and generate and transmit an authentication message to end device 199. The authentication message is also illustrated in FIG. 2A as "OPEN" and "SEQ:2." According to some exemplary implementations, although not illustrated, Wi-Fi access device 205 may also re-perform (steps (3) and (4)) based on receiving the authentication message. For this example, assume that the authentication is successful.

In step (8), based on the receipt of the authentication message, end device 199 may generate and transmit an association request. According to an exemplary embodiment, the association request may include the priority information. The association request may include a unique identifier of end device 199 and other information according to a Wi-Fi standard (e.g., various capabilities, etc.). In step (9), Wi-Fi access device 205 may receive the association message, may perform an association procedure, and may generate and transmit an association response to end device 199. According to some exemplary implementations, although not illustrated, Wi-Fi access device 205 may also re-perform (steps (3) and (4)) based on receiving the association request. For this example, assume that the association is successful and a Wi-Fi connection between end device 199 and Wi-Fi access device 205 is established.

Referring to FIG. 2B, in step (10), in response to receiving the association response, end device 199 may perform an authentication procedure with an ePDG 210 via Wi-Fi access device 205. As illustrated, Wi-Fi access device 205 may establish a tunnel (e.g., an Internet Protocol Security (IPsec) tunnel) with ePDG 210. In step (11), end device synchronization and authentication between end device 199 and a core network of PGW 215 via ePDG 210 may be performed. According to this example, assume successful authentication and other core network procedures, and that end device 199 may transmit data to and/or receive data from a PGW 215 (or other core device 155 (e.g., UPF, etc.)).

Although FIGS. 2A and 2B illustrate exemplary messaging for the process of the Wi-Fi admission control and prioritization service, according to other exemplary embodiment, the process may include different messages and/or different operations depending on, for example, the access devices 110 and/or core devices 155 involved. Additionally, or alternatively, according to other exemplary embodiments of the Wi-Fi admission control and prioritization service, Wi-Fi access device 205 may assign a unique identifier to the probe request of step (2) in response to receiving the probe request that includes the priority information. The unique identifier may be included in the probe request (e.g., a unique end device identifier) or an identifier generated by Wi-Fi access device 205. Wi-Fi access device 205 may store the identifier that correlates to the priority information (and end device 199). Consequently, the authentication open message of step (6) and/or the association request of step (8) may not include the priority information.

Figure 2C:
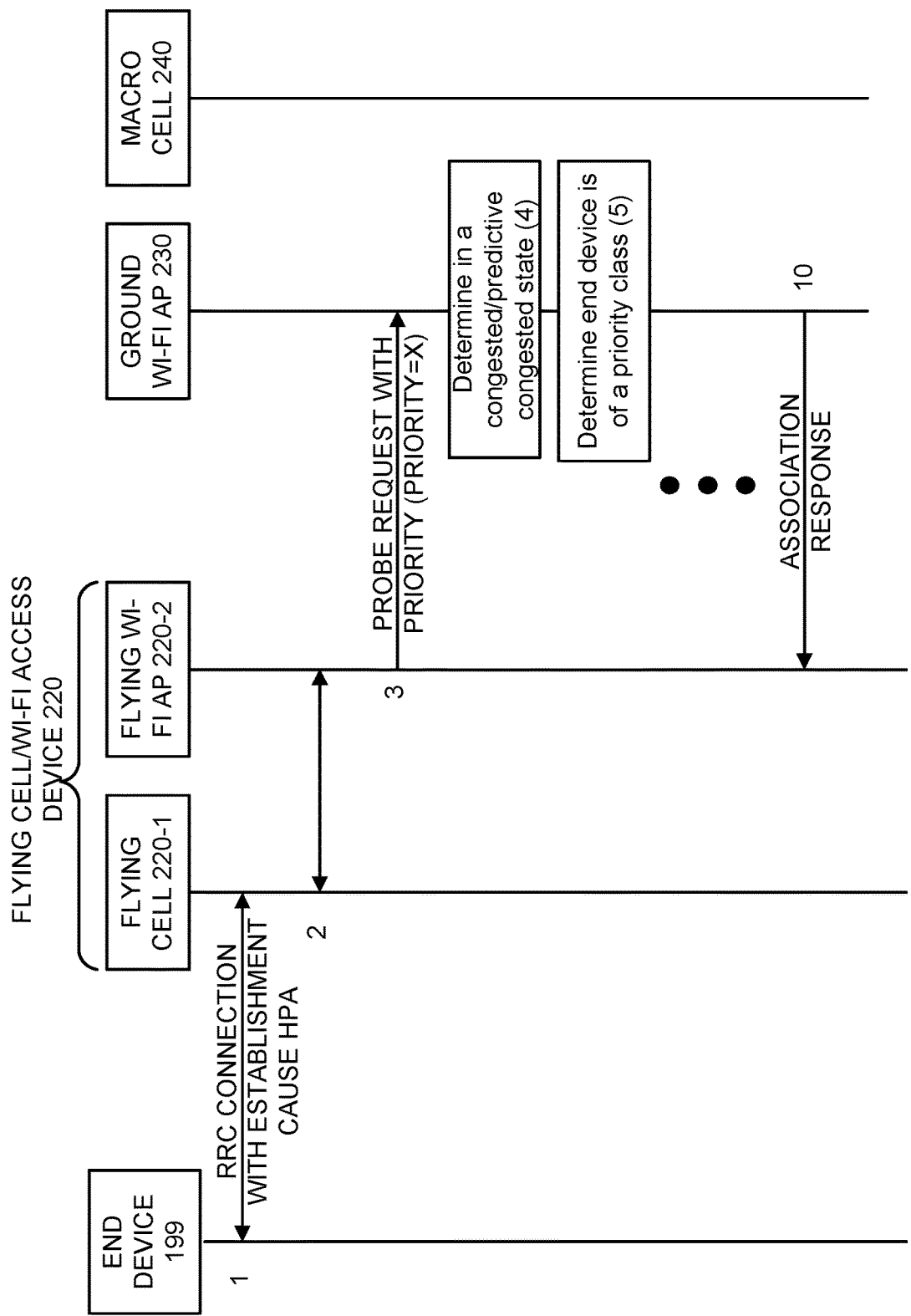
FIGS. 2C and 2D are diagrams illustrating another exemplary process in which an exemplary embodiment of the Wi-Fi admission control and prioritization service may be implemented.
Figure 2D:
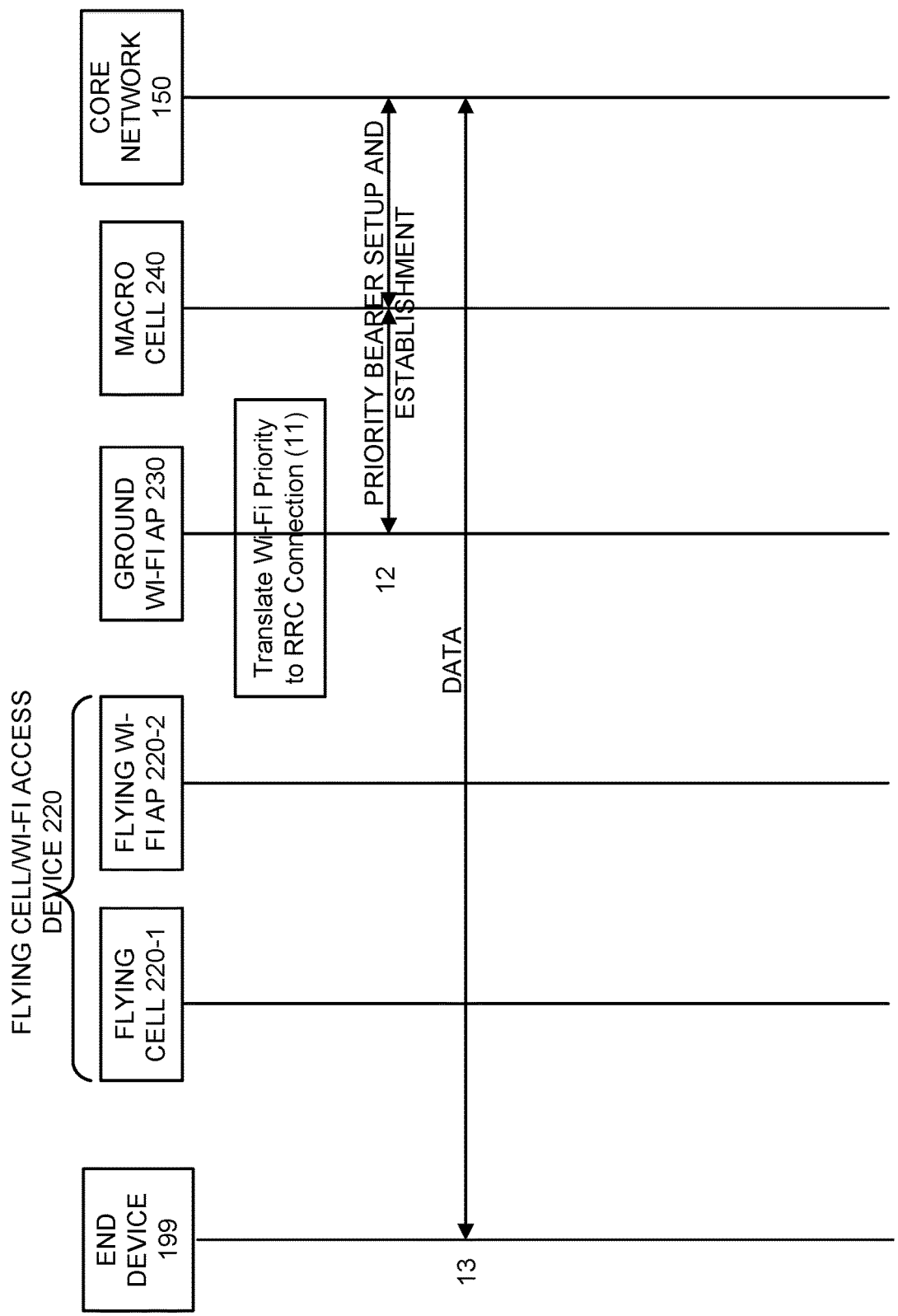

FIGS. 2C and 2D are diagrams illustrating another exemplary process of the Wi-Fi admission control and prioritization service. For example, the process may correspond to a signaling procedure between end device 199, a flying cell/Wi-Fi access device 220 (e.g., a flying cell 220-1 and a flying Wi-Fi AP 220-2), a ground Wi-Fi AP 230, and a macrocell 240. The messages described are exemplary. For purposes of description, according to an exemplary scenario, assume a priority user operates end device 199.

According to various exemplary embodiments, flying cell/Wi-Fi access device 220 may include a small cell (e.g., a femto cell, etc.), an eNB, a gNB, or other RAN device and a Wi-Fi access point that is communicatively coupled to the small cell or RAN device. According to other exemplary embodiments, flying cell/Wi-Fi access device 220 may include only a small cell or other RAN device, or only a Wi-Fi access point. Flying cell/Wi-Fi access device 220 may be implemented in an MAV, a UAV, or other type of aerial device. According to various exemplary embodiments, a ground Wi-Fi access device 230 may be communicatively coupled to a macrocell (e.g., an eNB, a gNB, etc.) or other ground-based RAN device.

According to various exemplary embodiments, the flying Wi-Fi AP 220-2 and/or ground Wi-Fi AP 230 may include the Wi-Fi admission control and prioritization service, as described herein. According to various exemplary embodiments, flying Wi-Fi AP 220-2 and/or ground Wi-Fi AP 230 may be in a congested state or a predicted congested state.

Referring to FIG. 2C, in step (1), end device 199 and flying cell 220-1 may establish a Radio Resource Control (RRC) connection based on an RRC Connection Establishment Procedure. As a part of this procedure, end device 199 may generate and transmit an RRC Connection request that includes an establishment cause. The establishment cause may indicate High Priority Access (HPA), such as access control class 11, 12, 13, 14, or 15, or access control class 10, 11, 12, 13, 14, or 15. In step (2), during the execution of the RRC Connection Establishment procedure, flying cell 220-1 and flying Wi-Fi AP 220-2 may exchange messages that establish a communicative coupling. For example, the messages may include an indication that end device 199 has a HPA.

In step (3), upon completion of the of RRC Connection Establishment procedure and the messages exchanged with flying cell 220-1, flying Wi-Fi AP 220-2 may generate and transmit a probe request with priority information to ground Wi-Fi AP 230. The messages and operations of step (3) through step (10) may be similar to those previously described in relation to steps (2) through step (9) illustrated in FIG. 2A. Referring to FIG. 2D, based on the completion of the Wi-Fi connection between flying Wi-Fi AP 202-2 and ground Wi-Fi AP 230, in step (11) ground Wi-Fi AP 230 may translate the Wi-Fi priority to an RRC Connection with HPA. For example, ground Wi-Fi AP 230 may indicate the HPA in an RRC procedure with macrocell 240 and an attachment procedure with core network 150. For example, in an LTE context, an initial message (e.g., S1 Application Protocol (S1AP)) may include an attach request, a packet data network (PDN) request, and priority information. In step (12), ground Wi-Fi AP 230, macrocell 240 and core network 150 may setup and establish a priority bearer on behalf of end device 199. In step (13), end device 199 may transmit and/or receive data via flying cell/Wi-Fi access device 220, ground Wi-Fi AP 230, macrocell 240, and core network 150.

Although FIGS. 2C and 2D illustrate exemplary messaging for the process of the Wi-Fi admission control and prioritization service, according to other exemplary embodiment, the process may include different messages and/or different operations depending on, for example, the access devices 110 and/or core devices 155 involved. Additionally, or alternatively, according to other exemplary embodiments of the Wi-Fi admission control and prioritization service, flying Wi-Fi AP 220-2 and/or ground Wi-Fi AP 230 Wi-Fi access device 205 may assign a unique identifier or a unique end device identifier, as previously described, for correlation to priority information pertaining to end device 199. Additionally, for example, according to other exemplary embodiments, flying cell/Wi-Fi access device 220 may include only flying Wi-Fi access point 220-2, Wi-Fi messaging may take place between end device 199 and flying Wi-Fi access point 220-2, and between flying Wi-Fi access point 220-2 and ground Wi-Fi access point 230.

As previously described, according to exemplary embodiments, the Wi-Fi admission control and prioritization service may afford priority to traffic of the priority user. For example, the Wi-Fi access point may afford priority by way of routing and/or processing traffic to and from an end device and/or a network device in a network path of a priority user's session. According to an exemplary embodiment, the Wi-Fi admission control and prioritization service may afford priority to all traffic associated with the priority user. According to another exemplary embodiment, the Wi-Fi admission control and prioritization service may afford priority to traffic according to traffic categories associated with WMM of the Wi-Fi standard, such as background, best effort, video, and voice.

According to an exemplary embodiment, a Wi-Fi access point may support QoS, such as the Wireless Multimedia Extension (WMM) enhancement pertaining to the Wi-Fi standard. Currently, the Wi-Fi standard defines eight user priorities, four access categories, and a queueing structure for different types of traffic associated with the access categories. However, the Wi-Fi standard does not provide any QoS and prioritization mapping between RAN standards (e.g., 3GPP, ITU, etc.) and Wi-Fi standards.

According to an exemplary embodiment, the Wi-Fi admission control and prioritization service may afford priority to all traffic associated with the priority user. For example, referring to a table 300 in FIG. 3, a QoS and priority mapping is shown. As illustrated, table 300 may store exemplary application service information. Table 300 may include a priority level field 305, a user priority field 310, and an access category field 315. As further illustrated, table 300 includes entries 330-1 through 330-10 (also referred as entries 330, or individually or generally as entry 330) that each includes a grouping of fields 305, 310, and 315 that are correlated (e.g., a record, etc.). Application service information is illustrated in tabular form merely for the sake of description. In this regard, application service information may be implemented in a data structure different from a table (e.g., a list, a flat file, etc.), a database, or other type of data file. The values illustrated in table 300 are exemplary.

Priority level field 305 may indicate access control classes associated with a RAN or other type of network, a network standard, and so forth. For example, as previously described, the priority user may have an access control class ranging from 11-15 or 10-15, while non-priority users (e.g., normal users) may have an access control class ranging from 0-9.

User priority field 310 may indicate a user priority associated with a Wi-Fi standard. For example, currently as previously described, the Wi-Fi standard defines eight user priorities (e.g., 0-7). According to some exemplary embodiments of the Wi-Fi admission control and prioritization service, user priorities may be expanded to include at least one additional user priority. A further description of this is described further below.

Access category field 315 may indicate an access category. For example, currently as previously described, the Wi-Fi standard defines four access categories. These access categories are AC-NK (background), AC_BE (best effort), AC_VI (video), and AC_VO (voice). According to some exemplary embodiments of the Wi-Fi admission control and prioritization service, user priorities may be expanded to include, for example, AC_HI (all traffic). A further description is provided below.

According to other exemplary implementations, table 300 may store additional, fewer, and/or different instances of application service information in support of the Wi-Fi admission control and prioritization service, as described herein.

Referring to table 300, normal users (e.g., 0-9) of the access control class may be correlated to the eight user priorities of the Wi-Fi standard. However, as illustrated in entries 330-9 and 330-10, according to an exemplary embodiment, priority users (e.g., 10-15) may be mapped to an expanded Wi-Fi category of users (e.g., 8 and 9). According to other exemplary embodiments, the priority users may be mapped to a different expanded Wi-Fi category. For example, the priority users (e.g., 10-15) may be mapped to the same expanded Wi-Fi category of users (e.g., 8). Alternatively, the priority users (e.g., 11-15) may be mapped to one or multiple expanded Wi-Fi categories of users. Alternatively, the priority user (e.g., 10) may be mapped to a separate Wi-Fi category of user, while the priority users (e.g., 11-15) may be mapped to one or multiple higher tiered Wi-Fi category of users.

Additionally, according to this embodiment, the access category may pertain to all traffic of the priority user. In this regard, any traffic including the four access categories of the Wi-Fi standard and any traffic that may fall outside of the four access categories of the Wi-Fi standard may be afforded with higher QoS and prioritization.

Figure 5:
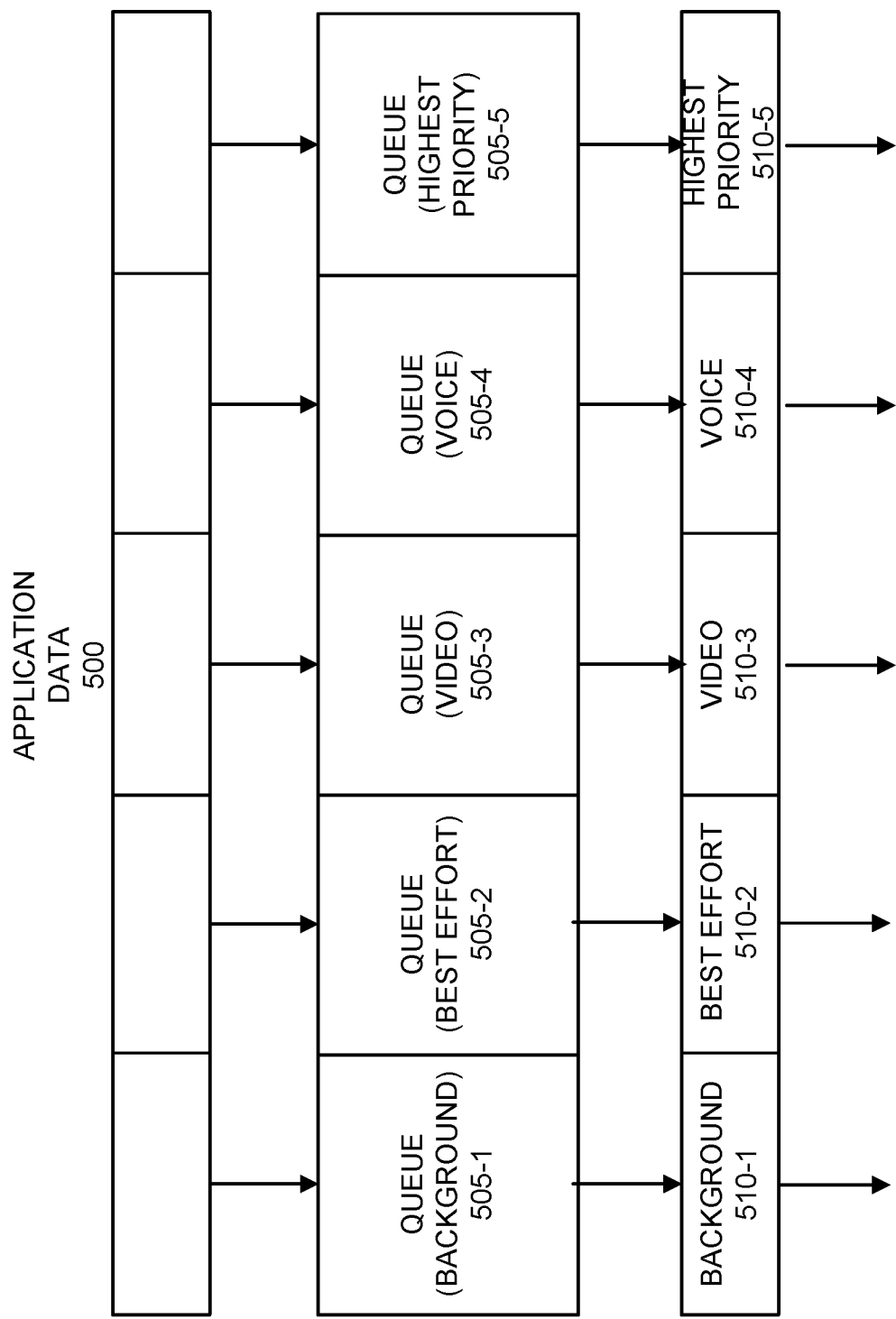
FIG. 5 is a diagram illustrating an exemplary quality of service and prioritization system of an exemplary embodiment of the Wi-Fi admission control and prioritization service.

Referring to FIG. 5, current Wi-Fi standards define a QoS WMM Queue system in which priorities have been assigned for each of the traffic types. The QoS, prioritization, scheduling, queuing, and other processes may include various parameters, such as back-off times, transmit opportunity times, contention window values, arbitration interframe space values, and other parameters or configurations. In view of the Wi-Fi admission control and prioritization service, an additional one or more queues and configurations may be used to support the priority users, as described herein. For example, in addition to queues 505-1 through 505-4 that may be configured to support background, best effort, video, and voice traffic, the Wi-Fi access point may further include one or multiple queues 505-5 that support the priority users (e.g., access control class 10-15 or 11-15). Additionally, the components of the system that may support various QoS, scheduling (back off values, etc.), etc., as illustrated by background 510-1, best effort 510-2, video 510-3, and voice 510-4, the system may further support such configurations for the priority users via highest priority 510-5. As such, application data 500 received by the Wi-Fi access point that includes the Wi-Fi admission control and prioritization service may provide QoS and prioritization associated with the priority users.

As previously described, according to another exemplary embodiment, the Wi-Fi admission control and prioritization service may afford priority to traffic according to traffic categories associated with WMM of the Wi-Fi standard, such as background, best effort, video, and voice. For example, referring to a table 400 in FIG. 4, a QoS and priority mapping is shown. As illustrated, table 400 may store exemplary application service information. Table 400 may include a priority level field 405, a user priority field 410, and an access category field 415. As further illustrated, table 400 includes entries 430-1 through 430-12 (also referred as entries 430, or individually or generally as entry 430) that each includes a grouping of fields 405, 410, and 415 that are correlated (e.g., a record, etc.). Application service information is illustrated in tabular form merely for the sake of description. In this regard, application service information may be implemented in a data structure different from a table (e.g., a list, a flat file, etc.), a database, or other type of data file. The values illustrated in table 400 are exemplary.

Priority level field 405, user priority field 410, and access category field 415 may store information similar to that previously described in relation to priority level field 305, user priority field 310, and access category field 315 of FIG. 3. However, in contrast, as illustrated in FIG. 4, the priority level mapping relates to only the four access categories of the Wi-Fi standard. According to this exemplary embodiment, the priority users (e.g., access control class 14 and 15) may have the highest priority for each traffic category or classification. According to other exemplary embodiments, the priority users and their associated access control class may be mapped differently relative to the eight user priorities of the Wi-Fi standard. For example, the priority user (e.g., access control class 10) may be mapped to Wi-Fi user priorities 2, 4, 7, and 10 associated with background, best effort, video, and voice traffic (e.g., entries 430-2, 430-5, 430-8, and 430-11), while priority users (e.g., access control classes 11-15) may be mapped to Wi-Fi user priorities 3, 5, 8, and 11 associated with background, best effort, video, and voice traffic (e.g., entries 430-3, 430-6, 430-9, and 430-12).

According to various exemplary embodiment associated with FIG. 4 and described herein, the QoS WMM Queue system of FIG. 5 may be modified to accommodate the different priority levels, user priority, and access category mappings of FIG. 4. For example, queues 505 and components 510 may include highest priority queues and highest priority components for priority users and each traffic category.

Figure 6:
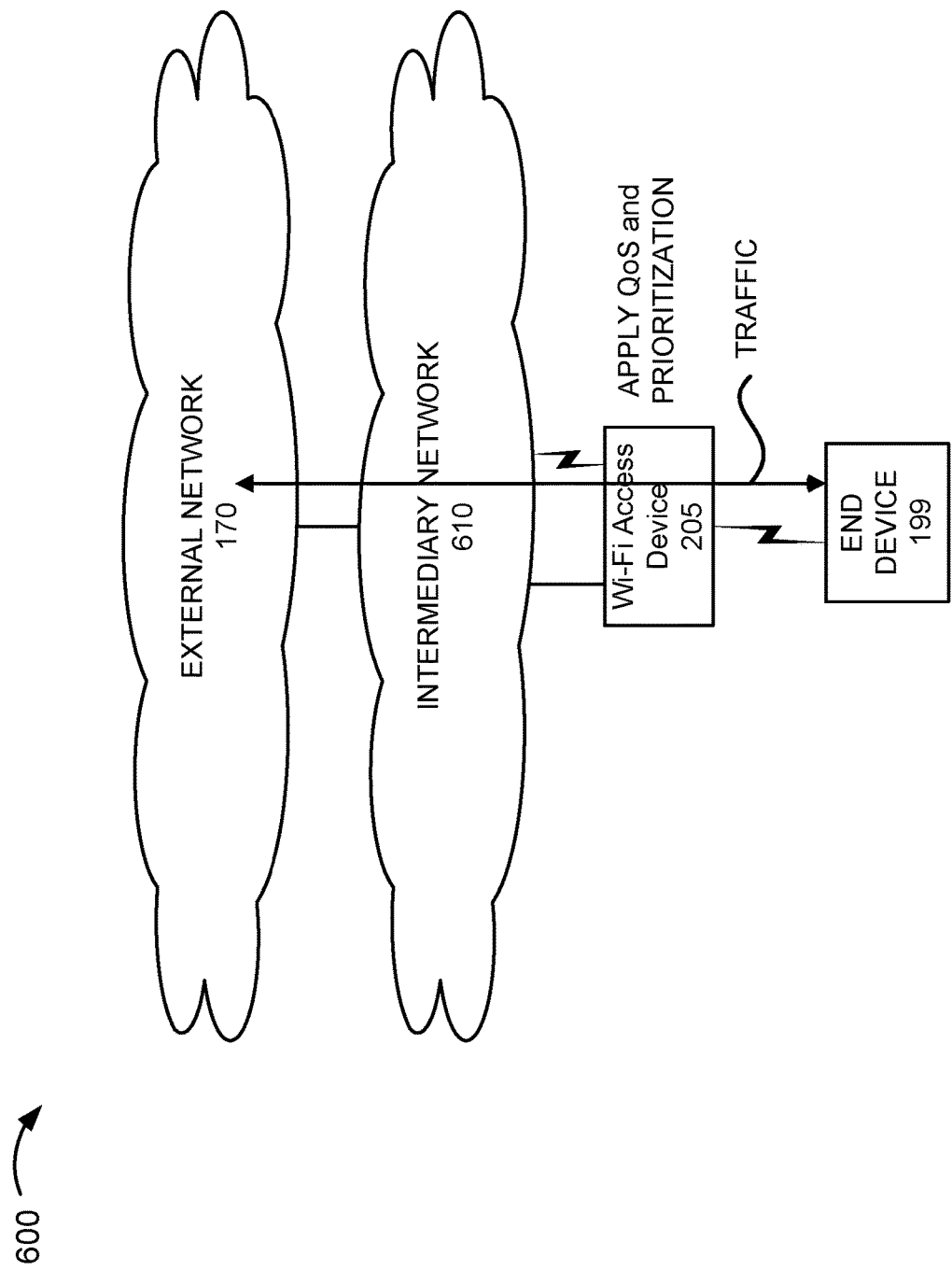
FIG. 6 is a diagram illustrating another exemplary environment in which an exemplary embodiment of a Wi-Fi admission control and prioritization service may be implemented.

The Wi-Fi admission control and prioritization service may provide QoS and prioritization to traffic of the priority user/end device that communicates via a Wi-Fi access point or a Wi-Fi traffic link interfaced to non-Wi-Fi networks (e.g., LTE, LTE-A, LTE-A Pro, 5G, a future generation network, etc.). For example, as illustrated in FIG. 6, end device 199 of a priority user (not illustrated) may establish and have an application service session in which traffic may be communicated via Wi-Fi access device 205 and an intermediary network 610 to/from external network 170. Intermediary network 610 may include access network 105, core network 150, and/or the Internet, for example. During the session, Wi-Fi access device 205 may apply QoS and prioritization to the traffic, as described herein. Wi-Fi access device 205 may or may not be in a congested state or a predicted state when the QoS and prioritization is provided as a part of the Wi-Fi admission control and prioritization service, as described herein.

Figure 7:
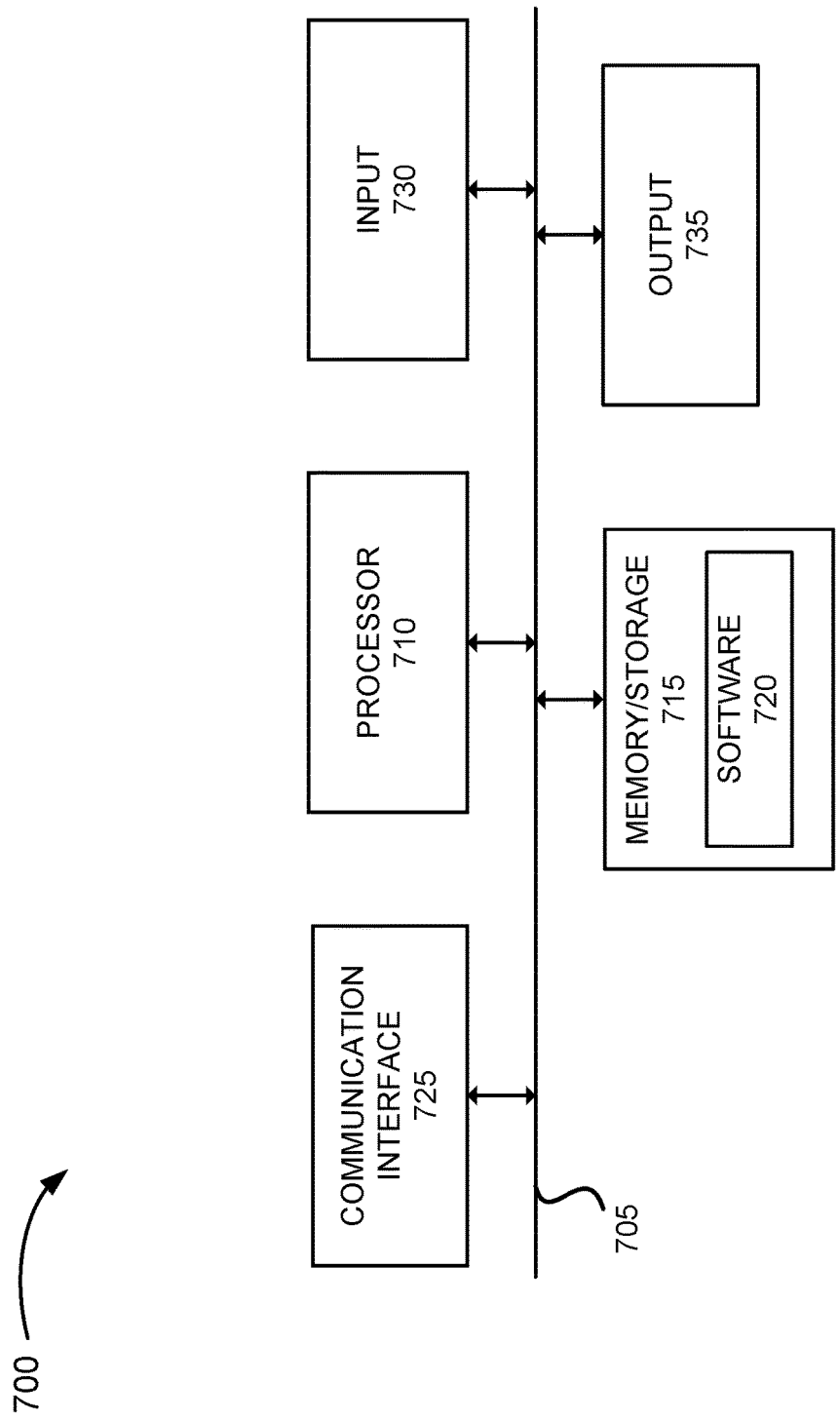
FIG. 7 is a diagram illustrating exemplary components of a device that may correspond to one or more of the devices illustrated and described herein.

FIG. 7 is a diagram illustrating exemplary components of a device 700 that may be included in one or more of the devices described herein. For example, device 700 may correspond to access devices 110, core devices 155, external devices 175, end devices 199, Wi-Fi Fi access device 205, ePDG 210, PGW 215, flying cell/Wi-Fi access device 220, ground Wi-Fi AP 230, macrocell 240, and other types of network devices or logic, as described herein. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to Wi-Fi access device 205 or a Wi-Fi access point, software 720 may include an application that, when executed by processor 710, provides a function of the Wi-Fi admission control and prioritization service, as described herein. Additionally, for example, with reference to end device 199, software 720 may include an application that, when executed by processor 710, provides a function of the Wi-Fi admission control and prioritization service. Software 720 may also include firmware, middleware, microcode, hardware description language (HDL), and/or other form of instruction. Software 720 may also be virtualized. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, application programming interface (API), etc.). Communication interface 725 may be implemented as a point-to-point interface, a service based interface, etc. Communication interface 725 may be implemented to include logic that supports the Wi-Fi admission control and prioritization service, such as the transmission and reception of messages, the inclusion of priority information, and so forth, as described herein.

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 700 may be implemented in the same manner. For example, device 700 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process and/or a function, as described herein. Alternatively, for example, according to other implementations, device 700 performs a process and/or a function as described herein based on the execution of hardware (processor 710, etc.).

Figure 8A:
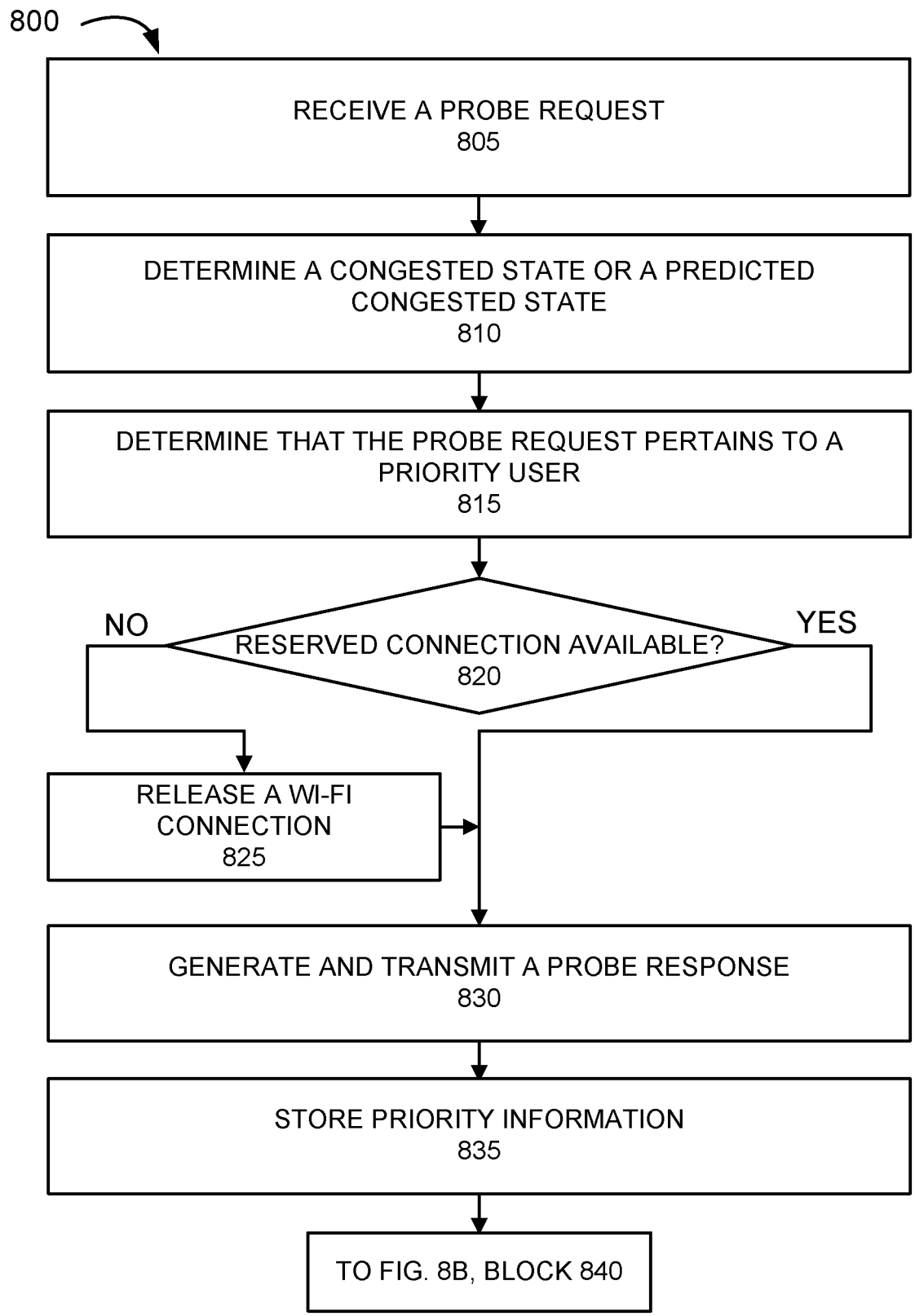
FIGS. 8A and 8B are a flow diagram illustrating an exemplary process of an exemplary embodiment of the Wi-Fi admission control and prioritization service.
Figure 8B:
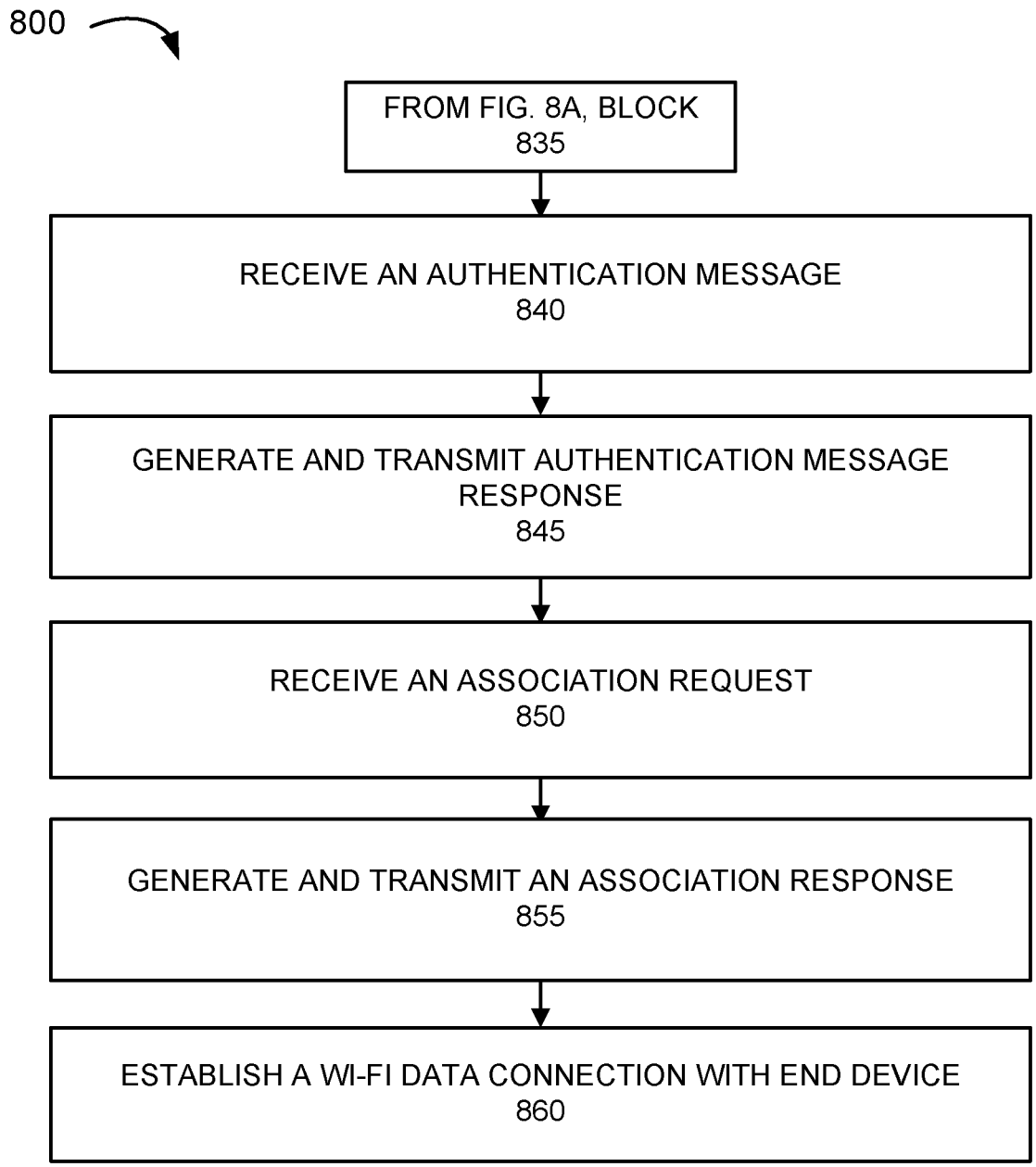

FIGS. 8A and 8B are a flow diagram illustrating an exemplary process 800 of an exemplary embodiment of the Wi-Fi admission control and prioritization service. According to an exemplary embodiment, Wi-Fi access device 205 may perform steps of process 800. Process 800 may include steps performed by Wi-Fi access device 205 to establish a Wi-Fi connection. According to an exemplary implementation, processor 710 executes software 720 to perform a step illustrated in FIGS. 8A and 8B, and described herein. Alternatively, a step illustrated in FIGS. 8A and 8B and described herein, may be performed by execution of only hardware. Wi-Fi access device 205 may reserve Wi-Fi connections for the priority users, as described herein.

According to various exemplary scenarios, the multi-RAT end device 199 may seek a Wi-Fi connection instead of an LTE, 5G, or other type of radio connection based on traffic offloading, cellular network failure, handover, lack of cellular coverage, or other circumstances that may prevent the multi-RAT end device 199 from establishing a radio connection with a non-Wi-Fi network. In some cases, such as traffic offloading or handover for example, Wi-Fi access device 205 may receive messaging from a RAN device in support of the offloading or handover.

Referring to FIG. 8A, in block 805, the Wi-Fi access device may receive a probe request. For example, end device 199 may transmit a probe request that includes priority information (e.g., access control class value, such as between 11-15 or 10-15). Wi-Fi access device 205 may receive the probe request.

In block 810, the Wi-Fi access device may determine that it is in a congested state or predicted congested state. For example, Wi-Fi access device 205 may determine that a maximum number of Wi-Fi connections are currently being serviced.

In block 815, the Wi-Fi access device may determine that the received probe request pertains to a priority user. For example, Wi-Fi access device 205 may read the priority information included in the probe request, and determine that the probe request pertains to a priority user, as described herein. Wi-Fi access device 205 may have a certain number or percentage of Wi-Fi connections (e.g., a reserved connection value) that indicates a maximum number of reserved connections available for the priority users.

In block 820, it may be determined whether a reserved connection is available. For example, Wi-Fi access device 205 may determine whether the reserved connection value is greater than a current usage value indicating the reserved Wi-Fi connections currently being used. Wi-Fi access device 205 may compare the reserved connection value to the current usage value to make such a determination.

When the current number of reserved Wi-Fi connections is equal to the reserved connection value (block 820-NO), the Wi-Fi access device may release a Wi-Fi connection (block 825). For example, based on the comparison, Wi-Fi access device 205 may determine that the current number of reserved Wi-Fi connections is equal to the reserved connection value. Wi-Fi access device 205 may release one of the Wi-Fi connections being used by a priority user. For example, Wi-Fi access device 205 may select the Wi-Fi connection to be released based on one or multiple factors, such as the state of the session, the priority of the priority user, and/or other session-related and/or user-related information, as described herein. Process 800 may continue to block 830.

When the current number of reserved Wi-Fi connections is not equal (e.g., below) the reserved connection value (block 820-YES), the Wi-Fi access device may generate and transmit a probe response to the end device (block 830). For example, based on the comparison, Wi-Fi access device 205 may determine that the current number of reserved Wi-Fi connections is less than the reserved connection value. Wi-Fi access device 205 may generate and transmit a probe response to end device 199.

In block 835, the Wi-Fi access device may store the priority information. For example, Wi-Fi access device 205 may store the priority information (e.g., an access control class value between 10-15 or 11-15) that is correlated to a MAC address of end device 199, another type end device identifier, or an identifier generated by Wi-Fi access device 205.

Referring to FIG. 8B, in block 840, the Wi-Fi access device may receive an authentication message. For example, Wi-Fi access device 205 may receive an authentication message from end device 199. Wi-Fi access device 205 may correlate the authentication message to the stored priority information and the unique identifier of end device 199. For example, Wi-Fi access device 205 may use the unique identifier of end device 199 to map the authentication message. In block 845, the Wi-Fi access device may generate and transmit an authentication message. For example, Wi-Fi access device 205 may generate and transmit an authentication message to end device 199.

In block 850, the Wi-Fi access device may receive an association request. For example, Wi-Fi access device 205 may receive an association request from end device 199. Wi-Fi access device 205 may correlate the association request to the stored priority information. In block 855, the Wi-Fi access device may generate and transmit an association response. For example, Wi-Fi access device 205 may generate and transmit an association response to end device 199. In block 860, the Wi-Fi access device may establish a Wi-Fi data connection. For example, Wi-Fi access device 205 may establish a Wi-Fi data connection, which supports an application service session, with end device 199.

FIGS. 8A and 8B illustrate an exemplary process 800 of the Wi-Fi admission control and prioritization service, however, according to other embodiments, process 800 may include additional operations, fewer operations, and/or different operations than those illustrated in FIGS. 8A and 8B, and described herein. For example, with reference to block 845 and 855, the authentication message and the association request may each include the priority information. Additionally, according to such an embodiment, block 835 may be omitted. Alternatively, for example, according to other exemplary embodiments, block 825 may not be performed. For example, when the Wi-Fi access point determines that all of the reserved connections are being used, the priority user may be denied access. According to another exemplary embodiment, the Wi-Fi access point may store the priority information when the Wi-Fi data connection is established.

Figure 9:
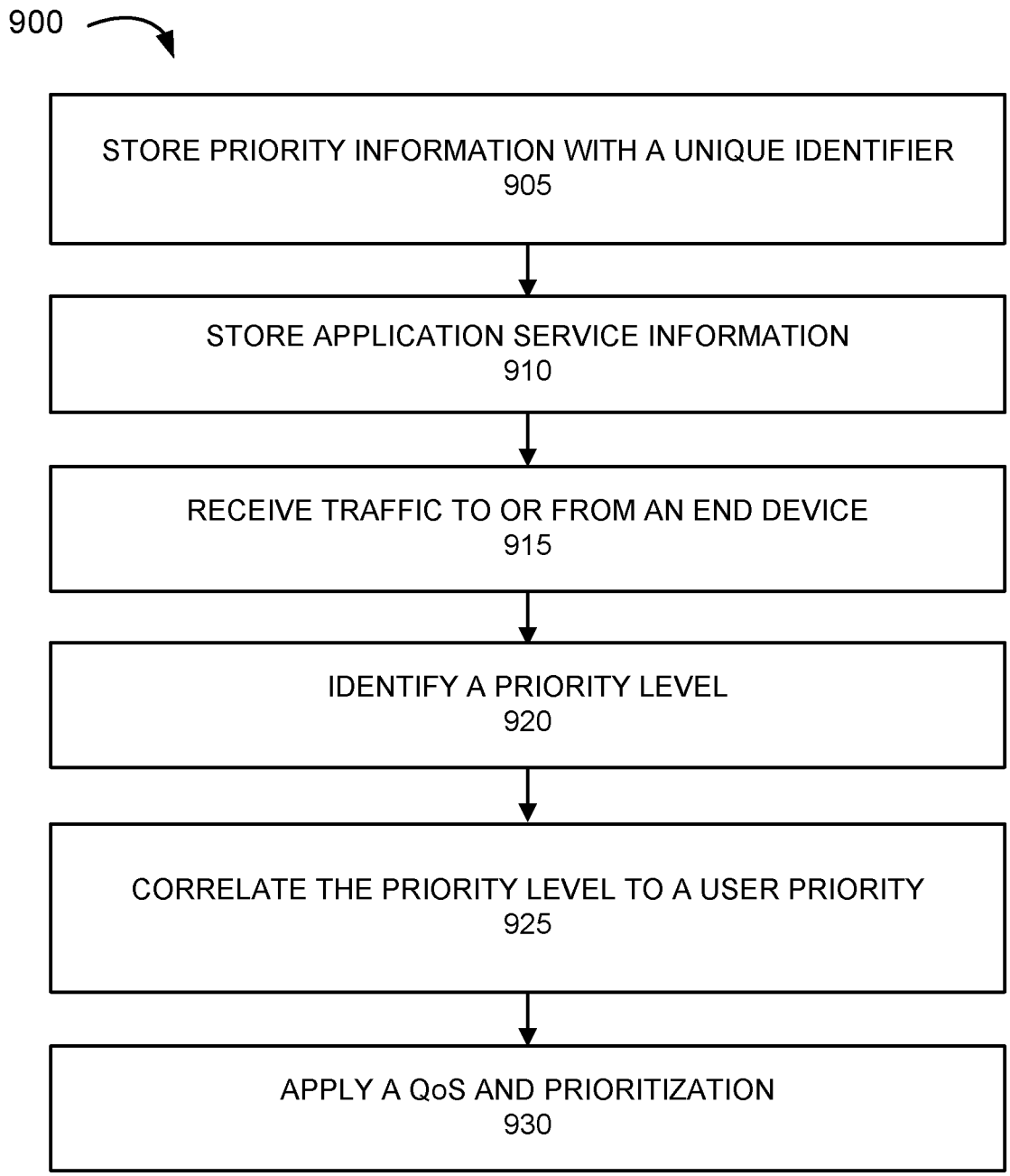
FIG. 9 is a flow diagram illustrating another exemplary process of an exemplary embodiment of the Wi-Fi admission control and prioritization service.

FIG. 9 is a flow diagram illustrating another exemplary process 900 of an exemplary embodiment of the Wi-Fi admission control and prioritization service. According to an exemplary embodiment, Wi-Fi access device 205 may perform steps of process 900. Process 900 may include steps performed by Wi-Fi access device 205, subsequent to the establishment of a Wi-Fi connection that pertain to QoS and prioritization of traffic (e.g., queuing, scheduling, etc.). According to an exemplary implementation, processor 710 executes software 720 to perform a step illustrated in FIG. 9, and described herein. Alternatively, a step illustrated in FIG. 9 and described herein, may be performed by execution of only hardware.

Referring to FIG. 9, in block 905, the Wi-Fi access device may store the priority information and a unique identifier. For example, Wi-Fi access device 205 may store the priority information (e.g., access control class value, such as between 11-15 or 10-15) and a unique identifier pertaining to end device 199 with which a Wi-Fi connection is established.

In block 910, the Wi-Fi access device may store application service information. For example, Wi-Fi access device 205 may store the application service information illustrated and described in relation to FIG. 3 or FIG. 4.

In block 915, the Wi-Fi access device may receive traffic to or from the end device. For example, Wi-Fi access device 205 may receive traffic to or from end device 199.

In block 920, the Wi-Fi access device may identify the priority level. For example, Wi-Fi access device 205 may correlate the traffic to the priority information and/or the unique identifier of end device 199. Wi-Fi access device 205 may determine an access control class value pertaining to end device 199 and the traffic.

In block 925, the Wi-Fi access device may correlate a priority level to a user priority. For example, Wi-Fi access device 205 may correlate the access control class value of the traffic to a matched access control value included in the application service information. Wi-Fi access device 205 may determine the QoS and prioritization that correlate to the matched access control value and/or the user priority that is above the user priorities of the Wi-Fi standard.

In block 930, the Wi-Fi access device may apply the QoS and prioritization. For example, Wi-Fi access device 205 may apply queueing, scheduling, and other parameters as described herein, to the traffic that are indicative of a higher priority and QoS relative to the eight user priorities of the Wi-Fi standard.

FIG. 9 illustrates an exemplary process 900 of the Wi-Fi admission control and prioritization service, however, according to other embodiments, process 900 may include additional operations, fewer operations, and/or different operations than those illustrated in FIG. 9, and described herein. For example, process 900 may include a step that identifies the type of traffic (e.g., background, best effort, voice, or video).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8A, 8B, and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 710) of a device. A non-transitory storage medium includes one or more of the storage mediums described in relation to memory/storage 715. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a Wi-Fi access device from an end device, a probe request that includes priority information that indicates an access control class of a priority user and associated priority of Wi-Fi access pertaining to the end device, wherein the access control class is between 10-15 or 11-15 associated with a Long Term Evolution network;
   determining, by the Wi-Fi access device, that the Wi-Fi access device is in a congested state or a predicted congested state;
   determining, by the Wi-Fi access device, that the probe request pertains to the priority user based on the priority information;
   generating, by the Wi-Fi access device based on determining that the probe request pertains to the priority user, a probe response;
   transmitting, by the Wi-Fi access device to the end device, the probe response; and
   establishing, by the Wi-Fi access device with the end device, a Wi-Fi data connection of a pool of reserved Wi-Fi data connections, which was reserved prior to receiving the probe request, for priority users.

2. The method of claim 1, wherein the probe request includes a service set identifier and a direct sequence spread spectrum set.

3. The method of claim 1, wherein the probe request includes a unique identifier of the end device, and the method further comprising:
   storing, by the Wi-Fi access device, the priority information and the unique identifier.

4. The method of claim 3, wherein the establishing further comprises:
   receiving, by the Wi-Fi access device from the end device, a first authentication message;
   identifying, by the Wi-Fi access device, that the first authentication message pertains to the priority user based on the stored priority information and the unique identifier;
   generating, by the Wi-Fi access device, a second authentication message, which is responsive to the first authentication message; and
   transmitting, by the Wi-Fi access device to the end device, the second authentication message.

5. The method of claim 1, further comprising:
   determining, by the Wi-Fi access device based on determining that the probe request pertains to the priority user, whether the pool of reserved Wi-Fi data connections has an available Wi-Fi data connection for the end device.

6. The method of claim 5, wherein when it is determined that the pool of reserved Wi-Fi data connections does not have the available Wi-Fi data connection, the method further comprises:
   selecting, by the Wi-Fi access device, one of currently used reserved Wi-Fi data connections based on at least one of session-related data or user-related data pertaining to the one of the currently used reserved Wi-Fi data connections;
   releasing, by the Wi-Fi access device, the one of the currently used reserved Wi-Fi data connections; and
   assigning, by the Wi-Fi access device, the released Wi-Fi data connection to the end device.

7. The method of claim 5, wherein determining whether the pool of reserved Wi-Fi data connections has the available Wi-Fi data connection further comprises:
   comparing, by the Wi-Fi access device, a reserved connection value that indicates a maximum number of Wi-Fi data connections allowed for the priority users to a current usage value that indicates a current number of Wi-Fi data connections being used by the priority users; and determining, by the Wi-Fi access device, whether the reserved connection value is greater than the current usage value.

8. The method of claim 7, wherein the reserved connection value is a dynamic value.

9. A Wi-Fi access device comprising:
a communication interface;
a memory, wherein the memory stores instructions; and
a processor, wherein the processor executes the instructions to:
receive, via the communication interface from an end device, a probe request that includes priority information that indicates an access control class of a priority user and associated priority of Wi-Fi access pertaining to the end device, wherein the access control class is between 10-15 or 11-15 associated with a Long Term Evolution network;
determine that the Wi-Fi access device is in a congested state or a predicted congested state;
determine that the probe request pertains to the priority user based on the priority information;
generate, based on the determination that the probe request pertains to the priority user, a probe response;
transmit, via the communication interface to the end device, the probe response; and
establish with the end device a Wi-Fi data connection of a pool of reserved Wi-Fi data connections, which was reserved prior to receiving the probe request, for priority users.

10. The Wi-Fi access device of claim 9, wherein the probe request includes a service set identifier and a direct sequence spread spectrum set.

11. The Wi-Fi access device of claim 9, wherein the probe request includes a unique identifier of the end device, and wherein the processor further executes the instructions to:
store the priority information and the unique identifier.

12. The Wi-Fi access device of claim 11, wherein, when establishing the Wi-Fi data connection, the processor further executes the instructions to:
receive, from the end device, a first authentication message;
identify that the first authentication message pertains to the priority user based on the stored priority information and the unique identifier;
generate a second authentication message, which is responsive to the first authentication message; and
transmit, via the communication interface to the end device, the second authentication message.

13. The Wi-Fi access device of claim 9, wherein the processor further executes the instructions to:
determine based on the determination that the probe request pertains to the priority user, whether the pool of reserved Wi-Fi data connections has an available Wi-Fi data connection for the end device.

14. The Wi-Fi access device of claim 13, wherein, when determining that the pool of reserved Wi-Fi data connection does not have the available Wi-Fi data connection, the processor further executes the instructions to:
select one of currently used reserved Wi-Fi data connections based on at least one of session-related data or user-related data pertaining to the one of the currently used reserved Wi-Fi data connections;
release the one of the currently used reserved Wi-Fi data connections; and
assign the released Wi-Fi data connection to the end device.

15. The Wi-Fi access device of claim 13, wherein, when determining whether the pool of reserved Wi-Fi data connections has the available Wi-Fi data connection, the processor further executes the instructions to:
compare a reserved connection value that indicates a maximum number of Wi-Fi data connections allowed for the priority users to a current usage value that indicates a current number of Wi-Fi data connections being used by the priority users; and
determine whether the reserved connection value is greater than the current usage value.

16. The Wi-Fi access device of claim 15, wherein the reserved connection value is a dynamic value.

17. A non-transitory computer-readable storage medium storing instructions executable by a processor of a Wi-Fi access device, which when executed cause the Wi-Fi access device to:
receive from an end device a probe request that includes priority information that indicates an access control class of a priority user and associated priority of Wi-Fi access pertaining to the end device, wherein the access control class is between 10-15 or 11-15 associated with a Long Term Evolution network;
determine that the Wi-Fi access device is in a congested state or a predicted congested state;
determine that the probe request pertains to the priority user based on the priority information;
generate, based on the determination that the probe request pertains to the priority user, a probe response;
transmit to the end device the probe response; and
establish with the end device a Wi-Fi data connection of a pool of reserved Wi-Fi data connections, which was reserved prior to receiving the probe request, for priority users.

18. The non-transitory computer-readable storage medium of claim 17, wherein the probe request includes a service set identifier and a direct sequence spread spectrum set.

19. The non-transitory computer-readable storage medium of claim 17, wherein the probe request includes a unique identifier of the end device, and wherein the instructions further comprise instructions, which when executed cause the Wi-Fi access device to:
store the priority information and the unique identifier.

20. The non-transitory computer-readable storage medium of claim 19, wherein when establishing the Wi-Fi data connection, the instructions further comprise instructions, which when executed cause the Wi-Fi access device to:
receive from the end device a first authentication message;
identify that the first authentication message pertains to the priority user based on the stored priority information and the unique identifier;
generate a second authentication message, which is responsive to the first authentication message; and
transmit to the end device, the second authentication message.

* * * * *